(12) United States Patent
Robison et al.

(10) Patent No.: US 11,178,314 B2
(45) Date of Patent: *Nov. 16, 2021

(54) SUPPRESSION OF IRON SIGHT BLOOMING IN INFRARED WEAPON SIGHTS

(71) Applicant: BAE SYSTEMS Information and Electronic Systems Integration Inc., Nashua, NH (US)

(72) Inventors: Derek T Robison, Acton, MA (US); Brendan P. Cirillo, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 490 days.

This patent is subject to a terminal disclaimer.

(21) Appl. No.: 16/210,792

(22) Filed: Dec. 5, 2018

(65) Prior Publication Data

US 2020/0186682 A1 Jun. 11, 2020

(51) Int. Cl.

| G02B 19/00 | (2006.01) |
| G02B 27/01 | (2006.01) |
| G06T 5/00 | (2006.01) |
| G06T 5/50 | (2006.01) |
| G06T 7/62 | (2017.01) |

(Continued)

(52) U.S. Cl.
CPC .............. *H04N 5/217* (2013.01); *F41G 1/01* (2013.01); *F41G 1/02* (2013.01); *F41G 1/36* (2013.01); *G06T 5/002* (2013.01); *G06T 5/50* (2013.01); *G06T 7/62* (2017.01); *H04N 5/33* (2013.01); *G06T 2207/10048* (2013.01); *G06T 2207/20021* (2013.01); *G06T 2207/20192* (2013.01); *G06T 2207/20224* (2013.01); *G06T 2207/30212* (2013.01)

(58) Field of Classification Search
CPC .......... F41G 1/01; F41G 1/02; F41G 1/32–36; G02B 19/009; G02B 2027/014; G02B 2027/019; G06T 5/002; G06T 5/50; G06T 7/62; G06T 2207/10048; G06T 2207/20021; G06T 2207/20192; G06T 2207/20224; G06T 2207/30212; H04N 5/217; H04N 5/33; H04N 3/1568; H04N 5/2175; H04N 5/359; H04N 5/3591; H04N 5/3592
See application file for complete search history.

(56) References Cited

FOREIGN PATENT DOCUMENTS

FR 2805352 A1 * 8/2001 .............. F41G 1/36

OTHER PUBLICATIONS

English translation of Clerc et al., FR 2805352 A1, retrieved from https://worldwide.espacenet.com/ on Jun. 9, 2021 (Year: 2001).*

* cited by examiner

*Primary Examiner* — Ryan S Dunning
(74) *Attorney, Agent, or Firm* — Maine Cernota & Rardin; Scott J. Asmus (57) ABSTRACT

A system for suppressing sight blooming in an infrared sight includes determining an n×n grid size; creating a grid of n×n averages; calculating a mean; determining if a heat source is detected; detecting a heat source radius; calculating the average of the outside boxes; estimating the average of the inside boxes; setting the source to zero; smoothing the boxes; subtracting the mean of the outside from the mean of the inside; feeding back the result into history; up-sampling the offset; subtracting the offsets; and displaying the image.

19 Claims, 6 Drawing Sheets

M4 COMPONENTS (51) Int. Cl.
    *H04N 5/217*     (2011.01)
    *H04N 5/33*     (2006.01)
    *F41G 1/01*     (2006.01)
    *F41G 1/02*     (2006.01)
    *F41G 1/36*     (2006.01)

PRIOR ART VISIBLE-LIGHT SIGHT IMAGES
FIG. 1

M4 COMPONENTS
FIG. 2

FIG. 3

METHOD STEPS
FIG. 4

IMAGE GRIDS EXAMPLE
FIG. 5

600    FIG. 6a

605 IR SCENE WITH BLOOMING

610 IR SCENE WITH BLOOMING SUPPRESSED

FIG. 6b
BEFORE AND AFTER SIGHT IR BLOOMING

SUPPRESSION OF IRON SIGHT BLOOMING IN INFRARED WEAPON SIGHTS

STATEMENT OF GOVERNMENT INTEREST

This invention was made with government support under Contract No. W91CRB-16-D-0030/0001 awarded by the U.S. Army. The United States Government has certain rights in the inventions.

FIELD OF THE DISCLOSURE

Weapons with both iron sight components and an infrared (IR) sight. Conventional front iron sight components become very hot as the barrel heats from firing. This front iron sight is in the field of view of the adjunct IR sight. Given that IR sights detect heat, the hot front iron sight in the field of view of the infrared sight can seriously degrade the desired IR sight image of the (cooler) scene. This disclosure relates to mitigating IR sight interference, more particularly, suppression of iron sight blooming in IR weapon sights.

BACKGROUND

Weapon sights provide visual alignment with an intended target. They can be simple iron markers that are aligned with the target, they can be optical devices providing a visible light image of the target aligned with the same focus as the aiming point, and they can be infrared wavelength imaging devices. Common essentials are accuracy, repeatability, and reliability. In the military context, a failed or inaccurate sight can result in serious consequences. Therefore, it is important that weapon sights be accurate, repeatable, and reliable in all operational environments. Traditional iron sights can be considered the standard. They are simple, low-cost, effective, and provide accuracy, repeatability, and reliability. They can function when more advanced sights fail. However, they can impede the operation of other sights, including infrared sights.

Figure 1:
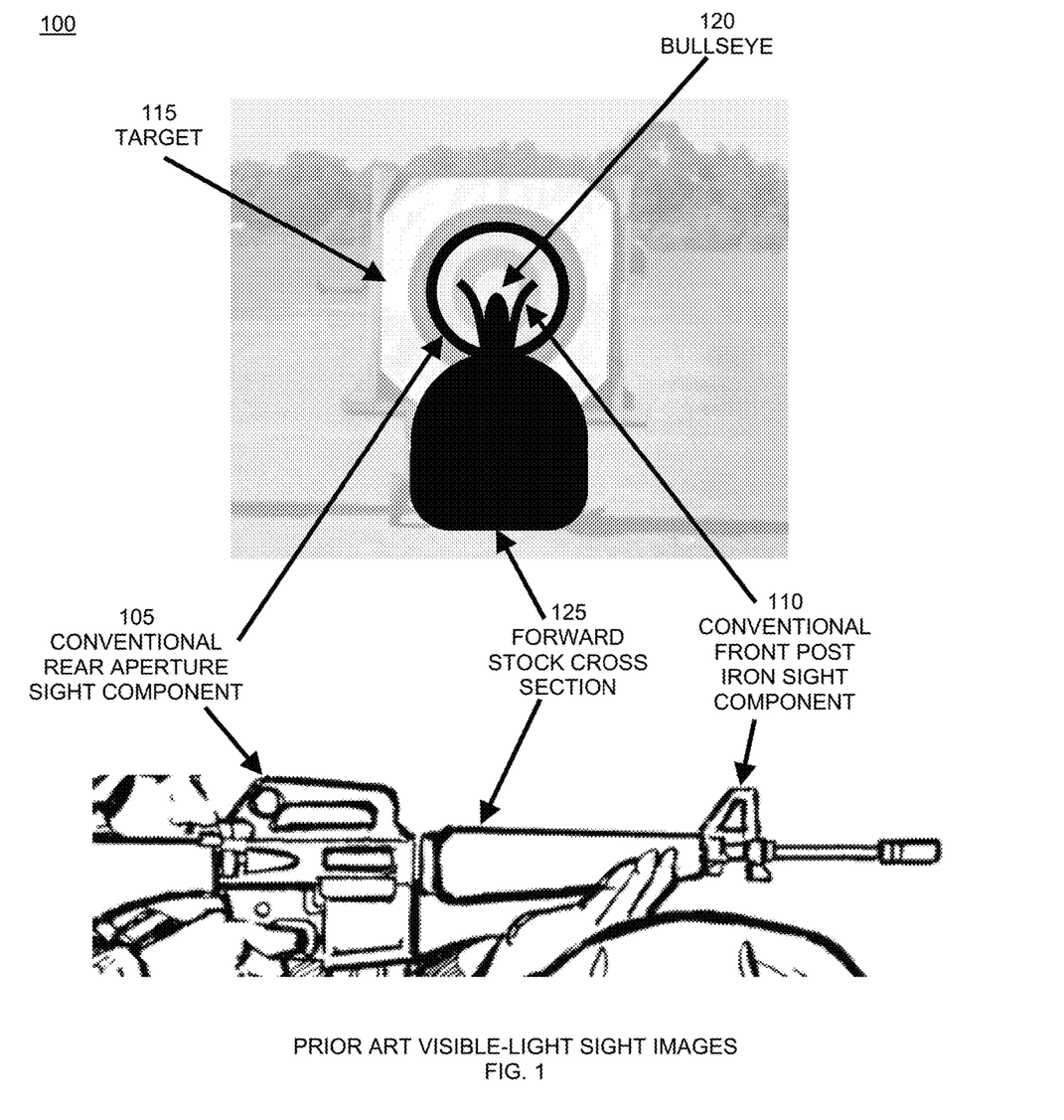
FIG. 1 illustrates a prior art visible-light sight configuration.

FIG. 1 illustrates prior art visible-light sight configuration 100. FIG. 1 shows a conventional iron sight view depicting rear aperture sight component 105 and front iron sight post component 110. Front and rear sight components are aligned on target 115 to hit the target bullseye 120. A forward stock cross section 125 is also depicted.

An infrared weapon sight is typically somewhat obstructed by the forward iron sight of a firearm. This iron sight is typically out of focus, so much that it cannot be seen in the image. However, after some amount of weapon fire, the iron sight heats up creating a large hot obstruction in the image, obscuring large amounts of usable space. What is needed is a device, system, and method to suppress sight blooming in infrared weapon sights that does not create image artifacts and has a small resource footprint.

SUMMARY

An embodiment provides a device for suppressing blooming for an infrared imager comprising an infrared imager; an infrared image processing module; a processor of the infrared image processing module: at the infrared image processing module, receiving infrared scene imagery from the infrared imager; in the infrared image processing module, processing the infrared scene to detect blooming; in the infrared image processing module, processing the infrared scene to suppress blooming; in an infrared display, displaying the infrared scene with blooming suppressed. Embodiments comprise, in the processor of the infrared image processing module, determining a size of a grid of n×n based on a format of a sensor of the infrared imager; creating a grid of n×n averages over an area of interest for a contiguous heat source proximate and in fixed relation to the infrared imager, whereby the region is down-sampled; calculating a mean of outer boxes of the n×n grid; determining if the contiguous heat source proximate and in fixed relation to the infrared imager is detected based on the mean of the outer boxes of the n×n grid; detecting, in a pattern moving out from a center, a radius of a signature of the contiguous heat source; calculating an average of all boxes outside of the radius; using the average as an estimate for an average within the contiguous heat source signature; smoothing boxes at and adjacent to outside of the radius, whereby edge artifacts are prevented; subtracting a mean outside of the radius from a mean inside the radius, producing a result; feeding back the result into the history; up-sampling offsets on a next frame back to original size; and subtracting the offsets from an image. In other embodiments, feeding back the result into the history comprises feeding back the result into the history through an Infinite Impulse Response filter. In subsequent embodiments, moving out from a center comprises moving out from a bottom center. Additional embodiments comprise setting a source of the boxes to zero to prevent feedback in a history, after using the average and before smoothing boxes. In another embodiment, sight blooming is produced by an iron front sight of a weapon. For a following embodiment the blooming suppression suppresses known, dynamic, non-uniformities. In subsequent embodiments, the image does not display image artifacts in or outside of a region of the contiguous heat source. In additional embodiments, n equals 30.

Another embodiment provides a method for suppressing blooming for an infrared imager comprising specifying a size of a grid of n×n based on a format of a sensor of the infrared imager; creating a grid of n×n averages over an area of interest for a contiguous heat source proximate and in fixed relation to the infrared imager, whereby the region is down-sampled; calculating a mean of outer boxes of the n×n grid; determining if the contiguous heat source proximate and in fixed relation to the infrared imager is detected based on the mean of the outer boxes of the n×n grid; detecting, in a pattern moving out from a center, a radius of a signature of the contiguous heat source; calculating an average of all boxes outside of the radius; using the average as an estimate for an average within the contiguous heat source signature; smoothing boxes at and adjacent to outside of the radius, whereby edge artifacts are prevented; subtracting a mean outside of the radius from a mean inside the radius, producing a result; feeding back the result into the history; up-sampling offsets on a next frame back to original size; and subtracting the offsets from an image; displaying the image in a display for the infrared imager; whereby the blooming in the image of the infrared imager is suppressed. In included embodiments, feeding back the result into the history comprises feeding back the result into the history through an Infinite Impulse Response filter. In yet further embodiments, moving out from a center comprises moving out from a bottom center. In related embodiments, the infrared imager comprises an infrared sight. For further embodiments, the sight blooming is produced by an iron front sight of a weapon. Ensuing embodiments comprise the step of setting a source of the boxes to zero to prevent feedback in a history, after the step of using the average and before the step of smoothing boxes. For yet further embodiments, the blooming suppression suppresses known, dynamic, non-uniformities. For more embodiments, the image does not display image artifacts in or outside of a region of the contiguous heat source. In continued embodiments, thermal performance is not degraded. For additional embodiments, Local Adaptive Contrast Enhancement algorithms are not employed.

A yet further embodiment provides a computer program product including one or more non-transitory machine-readable mediums encoding instructions that when executed by one or more processors cause a process to be carried out for suppressing blooming for an infrared imager, the process comprising creating a grid of n×n averages over an area of interest for the iron sight, whereby the region is down-sampled; calculating a mean of outer n×n boxes of the n×n grid; determining if a hot iron sight is detected based on the mean of the outer boxes of the n×n grid, wherein the mean of the outer boxes is compared to a mean of a central box, when a difference between the mean of the outer boxes and the mean of the center box crosses a threshold based on a response of the system, subsequent suppression steps are executed, wherein the threshold is set to about 3.5 degrees whereby some signature is ensured; detecting, in a pattern moving out from a bottom center, a radius of a signature of the hot iron sight; calculating an average of all boxes outside of the radius; using the average as an estimate for an average within the iron sight signature; setting a source of the boxes to zero to prevent feedback in a history, wherein boxes outside of the radius are set to an offset of zero regardless of their mean, negating local artifacts outside of a detected bloom; smoothing boxes at a threshold of radius detection and radius detection plus one whereby edge artifacts are prevented; subtracting a mean outside of the radius from a mean inside the radius, producing a result; feeding back the result into the history through an Infinite Impulse Response filter; up-sampling offsets on a next frame back to original size; and subtracting the offsets from an image; displaying the image in a display of the infrared sight; whereby the iron sight blooming is suppressed in the infrared sight.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments provide a system for suppressing blooming for an infrared imager. Blooming can be produced by a contiguous heat source that may be proximate and in a fixed relation to the infrared imager.

Figure 2:
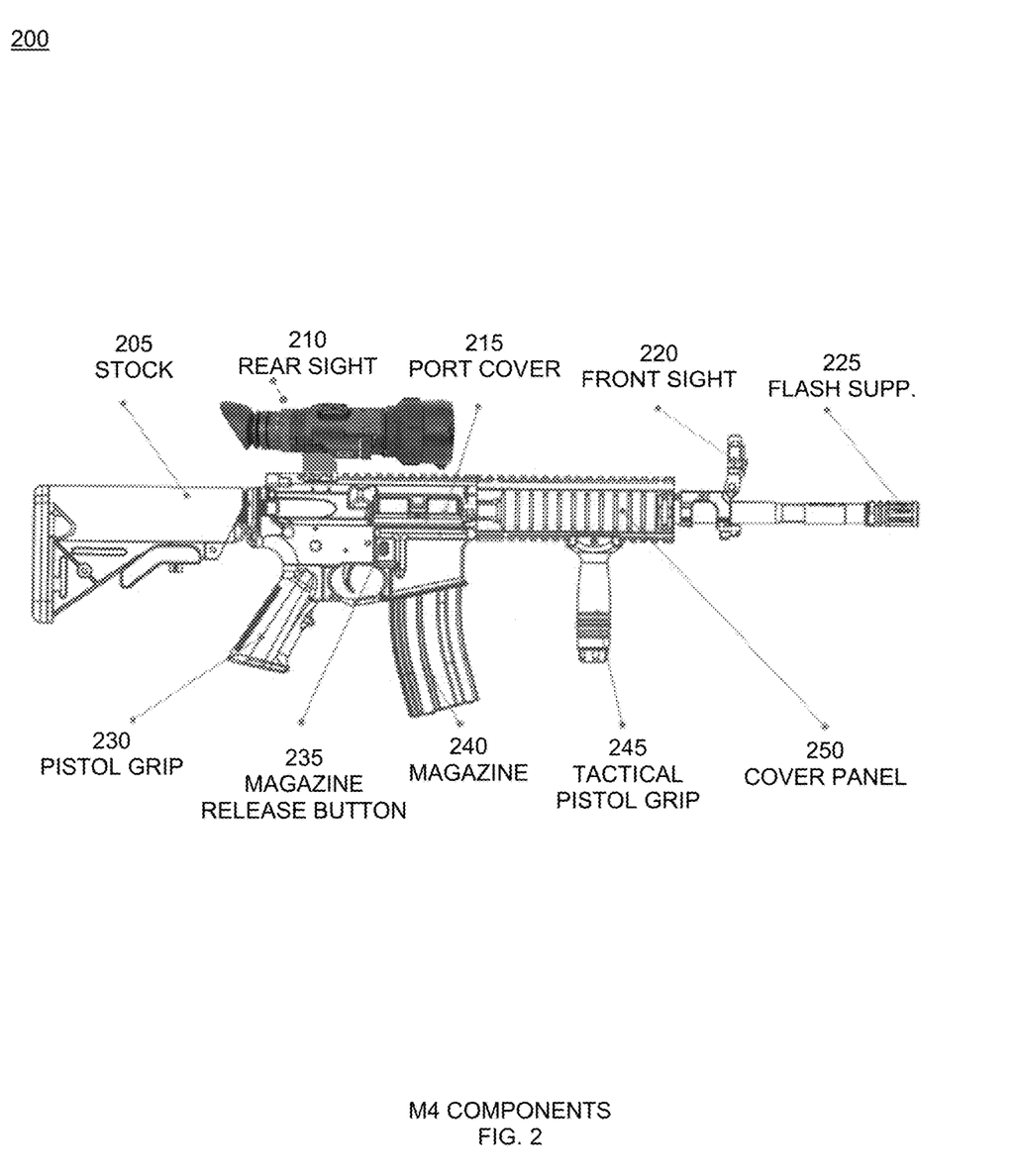
FIG. 2 illustrates weapon components configured in accordance with an embodiment.

FIG. 2 illustrates weapon components 200 in an illustrative example. Components comprise stock 205; rear (IR) sight 210; port cover 215; front (iron) post sight 220; flash hider/suppressor 225; pistol grip 230; magazine release button 240; tactical pistol grip 245; and cover panel 250.

Figure 3:
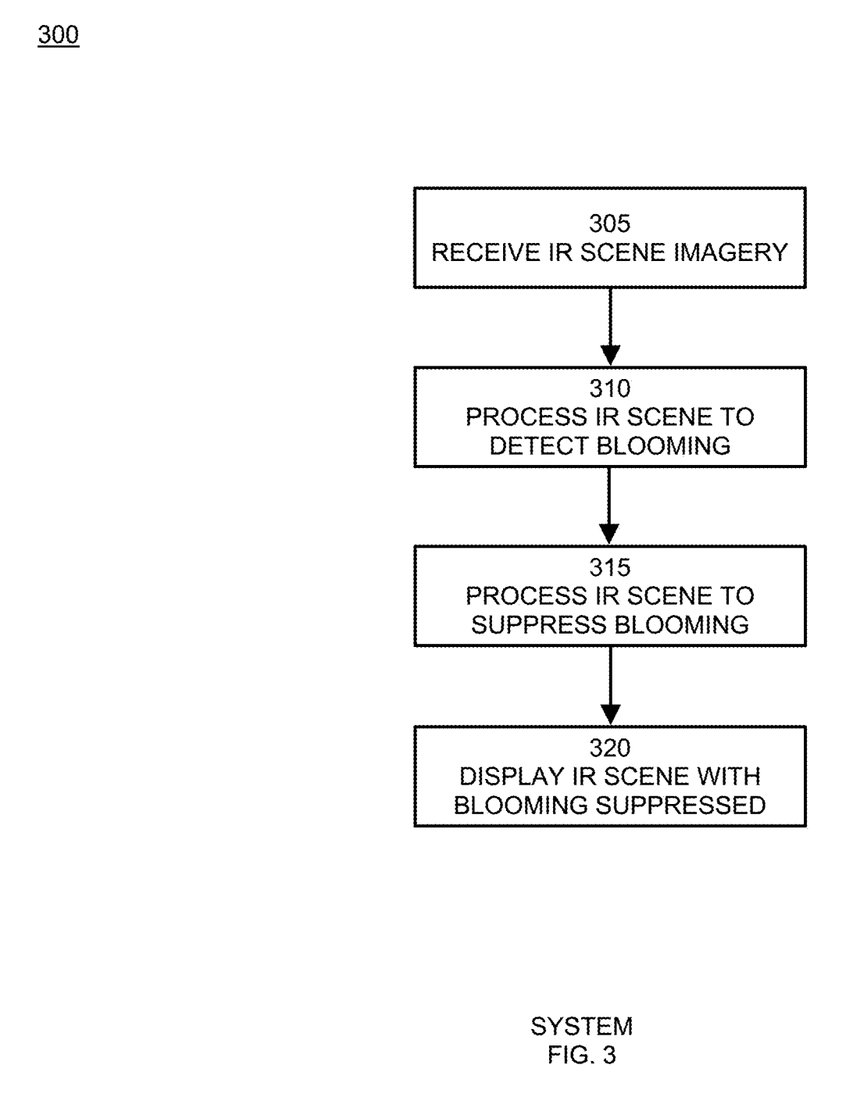
FIG. 3 depicts high level system steps configured in accordance with an embodiment.

FIG. 3 depicts high level system steps 300 according to one example. Steps comprise receiving IR scene imagery 305; processing the IR scene to detect IR blooming 310; processing the IR scene to suppress blooming 315; and displaying the IR scene with blooming suppressed 320.

Figure 4:
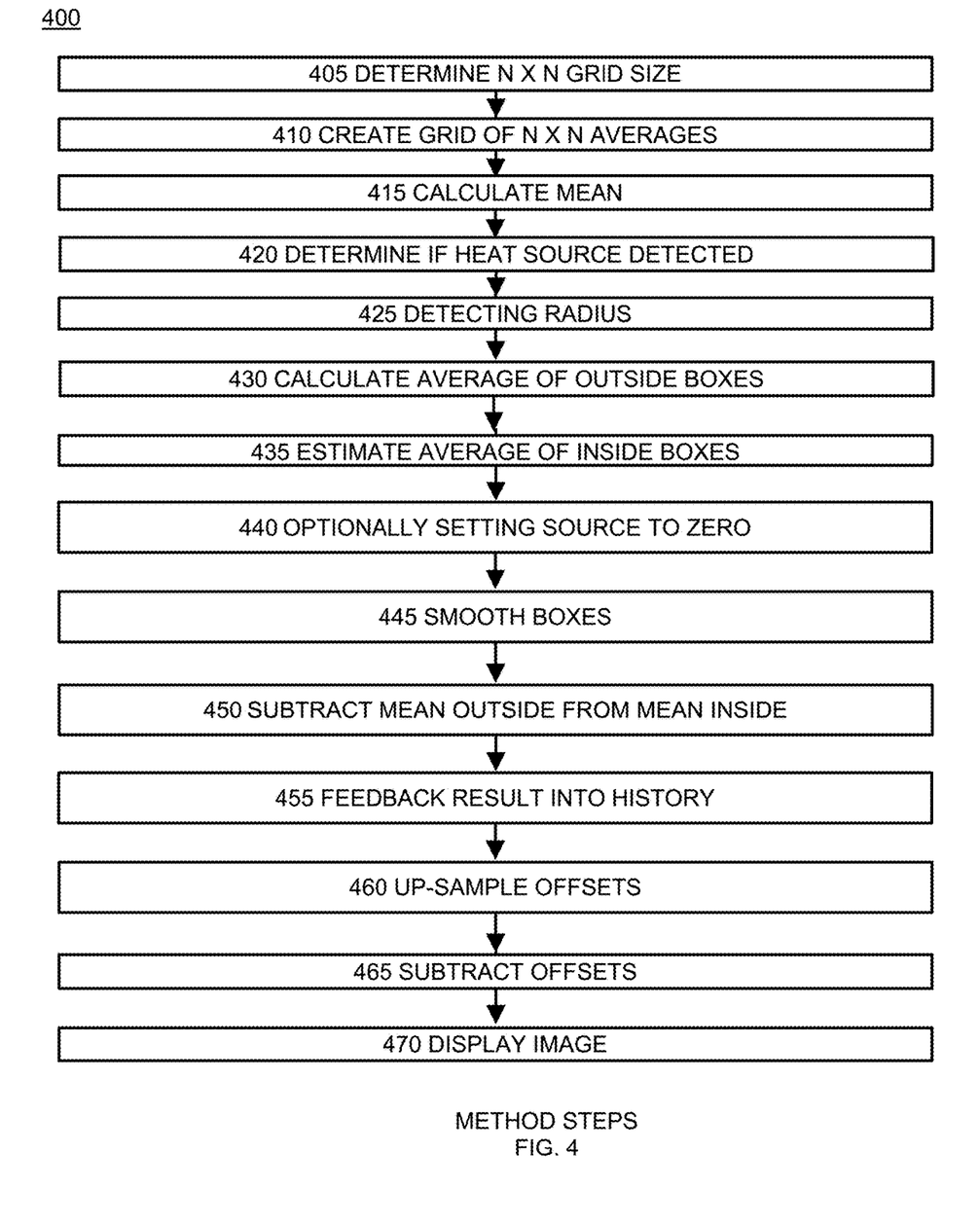
FIG. 4 is a flow chart for a method configured in accordance with an embodiment.

FIG. 4 is a flow chart for a method 400 in accordance with one embodiment. Steps comprise determining an n×n grid size 405; creating a grid of n×n averages 410; calculating a mean 415; determining if a heat source is detected 420; detecting a heat source radius 425; calculating the average of the outside boxes 430; estimating the average of the inside boxes 435; optionally setting the source to zero 440; smoothing the boxes 445; subtracting the mean of the outside from the mean of the inside 450; feeding back the result into history 455; up-sampling the offset 460; subtracting the offsets 465; and displaying the image 470.

Embodiments of the image processing method, in one example, create a grid of n×n averages over the area of interest for the iron sight, essentially down-sampling that region. The size of these averages is determined based on the format of the sensor. For example, in an embodiment, n equals 30 for a 30×30 grid of 32×32 pixel boxes centered on the bottom of a 1920×1200 imager for an M-240 weapon infrared sight. The mean of the outer boxes of this grid is calculated, and used as a basis for determining if blooming from a hot iron sight is detected. In a pattern moving out from the bottom center, the radius of the iron sight signature is detected. The average of all boxes outside of this radius is calculated and used as an estimate for what the average should be within the iron sight signature. The source of these boxes is set to zero to prevent feedback in the history. The boxes at the radius and just beyond are smoothed to prevent edge artifacts. The mean outside of the radius is then subtracted from the mean inside the radius. The result is fed back into a history through an Infinite Impulse Response (IIR) filter. On the next frame, the offsets are up-sampled back to original size and subtracted from the image.

In embodiments, a step determines whether IR blooming is present in the image. A blooming signature is confirmed when a difference between the mean of the outer boxes and the mean of the center box crosses a threshold based on a response of the system. In embodiments, the threshold is set to 3 to 4 degrees, or about 3.5 degrees. When blooming is detected and confirmed in this way, subsequent suppression steps are executed.

This method removes the effect of hot sight blooming and does not create image artifacts in or outside of the iron sight region, while keeping a small resource foot print. In contrast, Local Adaptive Contrast Enhancement (LACE) algorithms have large footprints and affect the entire frame. Embodiments suppress other known but dynamic non-uniformities in other systems.

Figure 5:
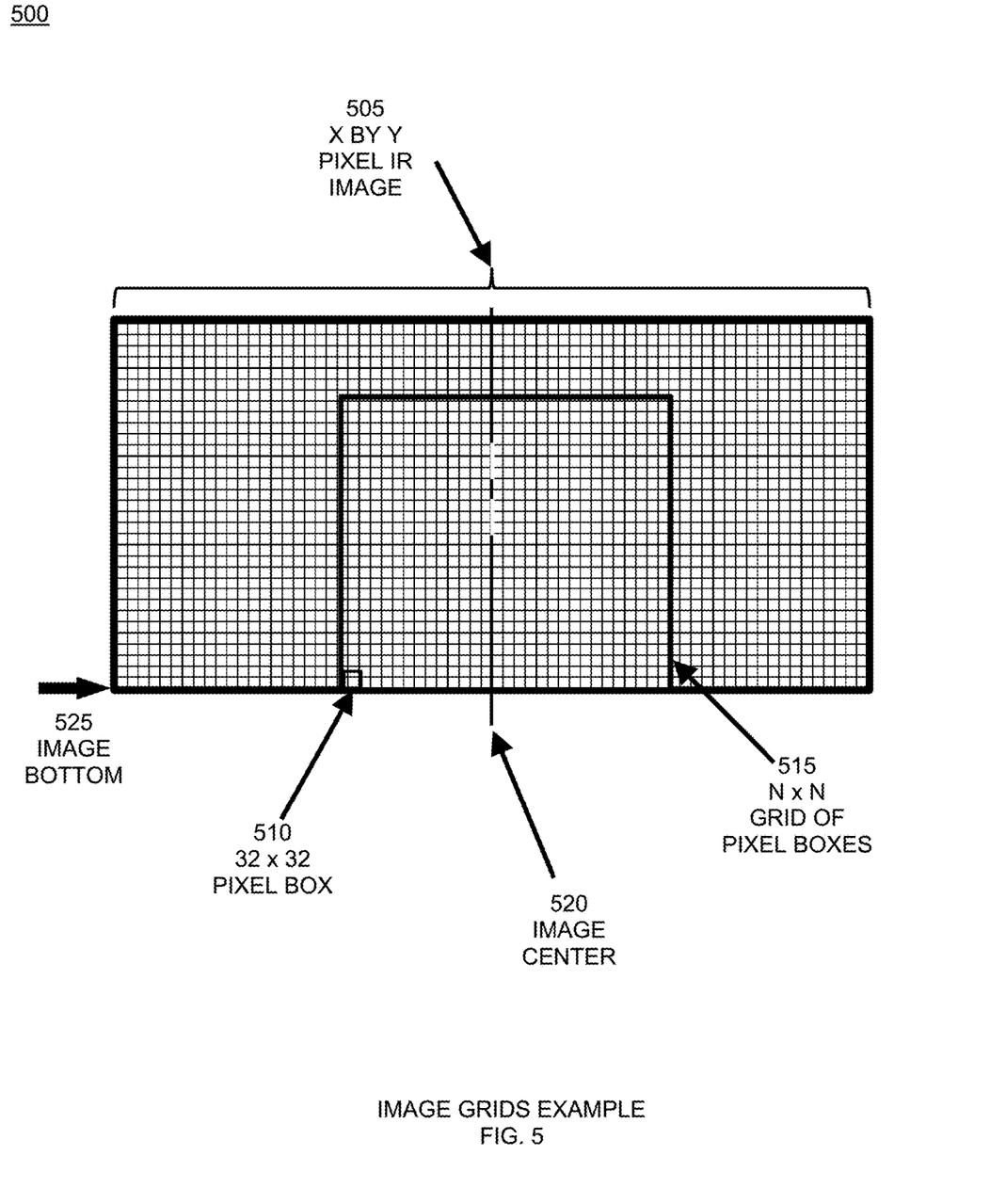
FIG. 5 depicts image grids configured in accordance with an embodiment.

FIG. 5 depicts image grids configured in accordance with an embodiment. An example IR image has x-by-y, 1920×1200, pixels 505. In an example, an n-by-n, 30×30, grid 515 of 32×32 pixel boxes 510 is centered 520 on the bottom 525 of the 1920×1200 image 505. As mentioned, this is used to first determine if blooming is present. Then if blooming is determined, calculations are made to suppress the blooming effects in a corrected image.

Figure 6A:
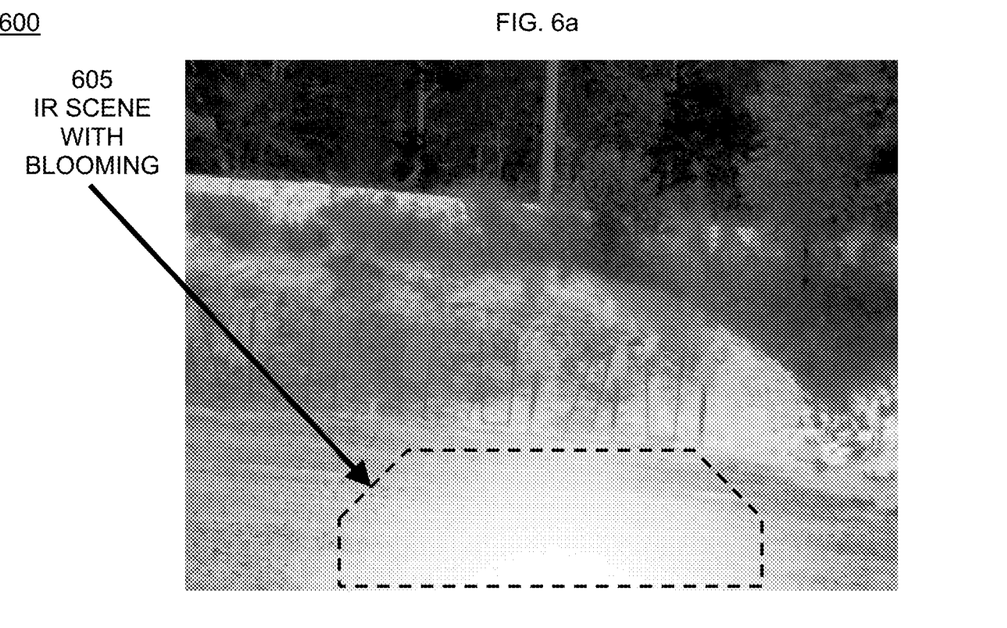
FIGS. 6a and 6b depict before and after suppression display results configured in accordance with an embodiment.
Figure 6B:
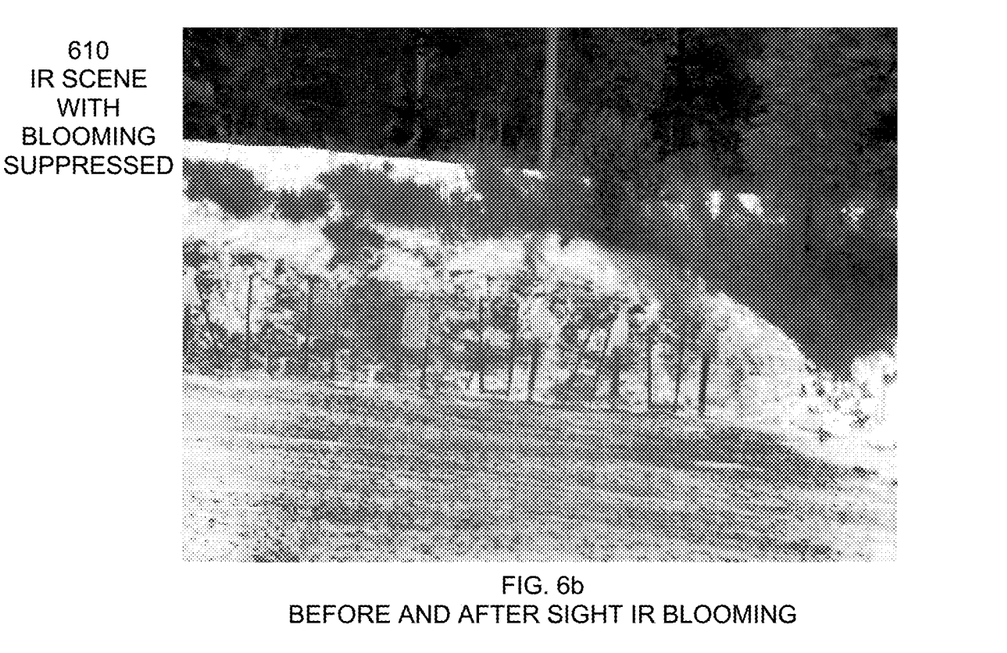

FIG. 6 depicts suppression displays 600 before FIG. 6a and after FIG. 6b blooming suppression results. Depicted are IR scene with blooming 605 and IR scene with blooming suppressed 610. Embodiments provide complete elimination of visible obstructions in a reduced weight, smaller volume system. They display minimal infrared obstructions which are out of focus, mostly transparent.

The computing system used for the suppression of blooming in infrared imagery for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A device for suppressing blooming for an infrared imager comprising:
    an infrared imager;
    an infrared image processing module;
    a processor of said infrared image processing module;
    at said infrared image processing module, receiving infrared scene imagery from said infrared imager;
    in said infrared image processing module, processing said infrared scene to detect blooming;
    in said infrared image processing module, processing said infrared scene to suppress blooming;
    in an infrared display, displaying said infrared scene with blooming suppressed; wherein, said processor of said infrared image processing module executes instructions comprising:
    determining a size of a grid of n×n based on a format of a sensor of said infrared imager;
    creating a grid of n×n averages over an area of interest for a contiguous heat source proximate and in fixed relation to said infrared imager, whereby said region is down-sample;
    calculating a mean of outer boxes of said n×n grid;
    determining if said contiguous heat source proximate and in fixed relation to said infrared imager is detected based on said mean of said outer boxes of said n×n grid;
    detecting, in a pattern moving out from a center, a radius of a signature of said contiguous heat source;
    calculating an average of all boxes outside of said radius;
    using said average as an estimate for an average within said contiguous heat source signature;
    smoothing boxes at and adjacent to outside of said radius, whereby edge artifacts are prevented;
    subtracting a mean outside of said radius from a mean inside said radius, producing a result;
    feeding back said result into said history;
    up-sampling offsets on a next frame back to original size; and
    subtracting said offsets from an image.

2. The device for suppressing blooming for an infrared imager of claim 1, wherein said feeding back said result into said history comprises feeding back said result into said history through an Infinite Impulse Response filter.

3. The device for suppressing blooming for the infrared imager of claim 1, wherein said moving out from a center comprises moving out from a bottom center.

4. The device for suppressing blooming for the infrared imager of claim 1, comprising:
    setting a source of said boxes to zero to prevent feedback in a history, after said using said average and before said smoothing boxes.

5. The device for suppressing blooming for the infrared imager of claim 1, wherein said sight blooming is produced by an iron front sight of a weapon.

6. The device for suppressing blooming for the infrared imager of claim 1, wherein said blooming suppression suppresses known, dynamic, non-uniformities.

7. The device for suppressing blooming for the infrared imager of claim 1, wherein said image does not display image artifacts in or outside of a region of said contiguous heat source.

8. The device for suppressing blooming for the infrared imager of claim 1, wherein n equals 30.

9. A method for suppressing blooming for an infrared imager comprising:
specifying a size of a grid of n×n based on a format of a sensor of said infrared imager;
creating a grid of n×n averages over an area of interest for a contiguous heat source proximate and in fixed relation to said infrared imager, whereby said region is down-sampled;
calculating a mean of outer boxes of said n×n grid;
determining if said contiguous heat source proximate and in fixed relation to said infrared imager is detected based on said mean of said outer boxes of said n×n grid;
detecting, in a pattern moving out from a center, a radius of a signature of said contiguous heat source;
calculating an average of all boxes outside of said radius;
using said average as an estimate for an average within said contiguous heat source signature;
smoothing boxes at and adjacent to outside of said radius, whereby edge artifacts are prevented;
subtracting a mean outside of said radius from a mean inside said radius, producing a result;
feeding back said result into said history;
up-sampling offsets on a next frame back to original size; and
subtracting said offsets from an image;
displaying said image in a display for said infrared imager;
whereby said blooming in said image of said infrared imager is suppressed.

10. The method for suppressing blooming for the infrared imager of claim 9, wherein said feeding back said result into said history comprises feeding back said result into said history through an Infinite Impulse Response filter.

11. The method for suppressing blooming for the infrared imager of claim 9, wherein said moving out from a center comprises moving out from a bottom center.

12. The method for suppressing blooming for the infrared imager of claim 9, wherein said infrared imager comprises an infrared sight.

13. The method for suppressing blooming for the infrared imager of claim 9, wherein said sight blooming is produced by an iron front sight of a weapon.

14. The method for suppressing blooming for the infrared imager of claim 9 comprising the step of:
setting a source of said boxes to zero to prevent feedback in a history, after said step of using said average and before said step of smoothing boxes.

15. The method for suppressing blooming for the infrared imager of claim 9, wherein said blooming suppression suppresses known, dynamic, non-uniformities.

16. The method for suppressing blooming for the infrared imager of claim 9, wherein said image does not display image artifacts in or outside of a region of said contiguous heat source.

17. The method for suppressing blooming for the infrared imager of claim 9, wherein thermal performance is not degraded.

18. The method for suppressing blooming for the infrared imager of claim 9, wherein Local Adaptive Contrast Enhancement algorithms are not employed.

19. A computer program product including one or more non-transitory machine-readable mediums encoding instructions that when executed by one or more processors cause a process to be carried out for suppressing iron sight blooming for an infrared imager, the process comprising:
creating a grid of n×n averages over an area of interest for an iron sight, whereby said region is down-sampled;
calculating a mean of outer n×n boxes of said n×n grid;
determining if a hot iron sight is detected based on said mean of said outer boxes of said n×n grid, wherein said mean of said outer boxes is compared to a mean of a central box, when a difference between said mean of said outer boxes and said mean of said center box crosses a threshold based on a response of said system, subsequent suppression steps are executed, wherein said threshold is set to about 3.5 degrees whereby some signature is ensured;
detecting, in a pattern moving out from a bottom center, a radius of a signature of said hot iron sight;
calculating an average of all boxes outside of said radius;
using said average as an estimate for an average within said iron sight signature;
setting a source of said boxes to zero to prevent feedback in a history, wherein boxes outside of said radius are set to an offset of zero regardless of their mean, negating local artifacts outside of a detected bloom;
smoothing boxes at a threshold of radius detection and radius detection plus one whereby edge artifacts are prevented;
subtracting a mean outside of said radius from a mean inside said radius, producing a result;
feeding back said result into said history through an Infinite Impulse Response filter;
up-sampling offsets on a next frame back to original size; and
subtracting said offsets from an image;
displaying said image in a display of said infrared sight;
whereby said iron sight blooming is suppressed in said infrared sight.

* * * * *